(12) United States Patent  
Park

(10) Patent No.: US 12,467,979 B2
(45) Date of Patent: Nov. 11, 2025

(54) ABNORMAL CELL DIAGNOSING METHOD AND BATTERY SYSTEM APPLYING THE SAME

(71) Applicant: LG Energy Solution, Ltd., Seoul (KR)

(72) Inventor: Junguk Park, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 366 days.

(21) Appl. No.: 17/789,966

(22) PCT Filed: Jul. 20, 2021

(86) PCT No.: PCT/KR2021/009296
§ 371 (c)(1),
(2) Date: Jun. 29, 2022

(87) PCT Pub. No.: WO2022/019600
PCT Pub. Date: Jan. 27, 2022

(65) Prior Publication Data
US 2022/0390520 A1  Dec. 8, 2022

(30) Foreign Application Priority Data

Jul. 24, 2020  (KR) .................. 10-2020-0092349

(51) Int. Cl.
*G01R 31/385* (2019.01)
*G01R 19/165* (2006.01)
(Continued)

(52) U.S. Cl.
CPC ..... *G01R 31/385* (2019.01); *G01R 19/16542* (2013.01); *G01R 19/30* (2013.01);
(Continued)

(58) Field of Classification Search
CPC ............ G01R 31/385; G01R 19/16542; G01R 31/396; H01M 10/425; H01M 10/482; H01M 2010/4271
See application file for complete search history.

(56) References Cited

U.S. PATENT DOCUMENTS

2002/0084785 A1  7/2002  Park
2009/0085516 A1  4/2009  Emori et al.
(Continued)

FOREIGN PATENT DOCUMENTS

CN  103154748 A  6/2013
CN  104838522 A  8/2015
(Continued)

OTHER PUBLICATIONS

Machine translation of JP2001025173A (Year: 2001).*
(Continued)

*Primary Examiner* — Lee E Rodak
*Assistant Examiner* — Sangkyung Lee
(74) *Attorney, Agent, or Firm* — Lerner David LLP

(57) ABSTRACT

A battery system includes: a battery pack including a plurality of battery cells; and a battery management system for setting numbers to the battery cells by measuring cell voltages of the respective battery cells at a wake-up time, detecting a maximum cell voltage and a minimum cell voltage by periodically measuring the cell voltage of the respective battery cells after the wake-up, comparing the minimum cell voltage and the cell voltage of at least one first diagnosis target battery cell, comparing the maximum cell voltage and the cell voltage of at least one second diagnosis target battery cell, and diagnosing whether the diagnosis target battery cell is abnormal according to results of the comparison.

12 Claims, 4 Drawing Sheets

(51) Int. Cl.
  *G01R 19/30* (2006.01)
  *G01R 31/396* (2019.01)
  *H01M 10/42* (2006.01)
  *H01M 10/48* (2006.01)

(52) U.S. Cl.
  CPC ........ *G01R 31/396* (2019.01); *H01M 10/425* (2013.01); *H01M 10/482* (2013.01); *H01M 2010/4271* (2013.01)

(56) References Cited

U.S. PATENT DOCUMENTS

| | | | |
|---|---|---|---|
| 2010/0085009 | A1 | 4/2010 | Kang et al. |
| 2010/0185405 | A1 | 7/2010 | Aoshima et al. |
| 2011/0285538 | A1* | 11/2011 | Lee ............... G01R 31/28 324/433 |
| 2012/0025769 | A1 | 2/2012 | Kikuchi et al. |
| 2012/0046893 | A1* | 2/2012 | Kaneko ............ B60L 58/21 702/63 |
| 2013/0234719 | A1 | 9/2013 | Sekizaki et al. |
| 2013/0323553 | A1 | 12/2013 | Bergmann |
| 2014/0176078 | A1* | 6/2014 | Lai ............... H02J 7/0014 320/134 |
| 2015/0191102 | A1* | 7/2015 | Kubo ............. G01R 31/396 701/34.4 |
| 2015/0333541 | A1* | 11/2015 | Butzmann ........ H01M 10/425 320/112 |
| 2015/0355286 | A1 | 12/2015 | Kobayashi et al. |
| 2017/0199250 | A1* | 7/2017 | Yoon ............. G01R 19/16542 |
| 2019/0198945 | A1 | 6/2019 | Machida et al. |
| 2022/0032814 | A1 | 2/2022 | Lee |

FOREIGN PATENT DOCUMENTS

| | | | |
|---|---|---|---|
| DE | 102013205334 | A1 | 10/2014 |
| JP | 2001025173 | A * | 1/2001 |
| JP | 2002216858 | A | 8/2002 |
| JP | 2010164329 | A | 7/2010 |
| JP | 2012047519 | A | 3/2012 |
| JP | 5597349 | B2 | 10/2014 |
| JP | 5670693 | B2 | 2/2015 |
| JP | 2016197115 | A | 11/2016 |
| JP | 2016217900 | A | 12/2016 |
| JP | 2017173071 | A | 9/2017 |
| JP | 2019113455 | A | 7/2019 |
| JP | 2021535721 | A | 12/2021 |
| KR | 20130067676 | A * | 6/2013 |
| KR | 101402802 | B1 | 6/2014 |
| KR | 101482147 | B1 | 1/2015 |
| KR | 101527136 | B1 | 6/2015 |
| KR | 101539810 | B1 | 7/2015 |
| KR | 101744713 | B1 | 6/2017 |
| KR | 20180033351 | A | 4/2018 |
| KR | 20190083915 | A * | 7/2019 |
| KR | 20200080353 | A | 7/2020 |
| WO | 2014115513 | A1 | 7/2014 |
| WO | 2020141938 | A2 | 7/2020 |

OTHER PUBLICATIONS

Machine translation of KR20130067676A (Year: 2013).*
Machine translation of KR20190083915A (Year: 2019).*
Extended European Search Report including Written Opinion for Application No. 21846657.1 dated May 26, 2023, pp. 1-5.
International Search Report for Application No. PCT/KR2021/009296 mailed Nov. 2, 2021, pp. 1-3.

* cited by examiner

ABNORMAL CELL DIAGNOSING METHOD AND BATTERY SYSTEM APPLYING THE SAME

CROSS-REFERENCE TO RELATED APPLICATIONS

The present application is a national phase entry under 35 U.S.C. § 371 of International Application No. PCT/KR2021/009296 filed Jul. 20, 2021, which claims priority from Korean Patent Application No. 10-2020-0092349 filed Jul. 24, 2020, all of which are incorporated herein by reference.

BACKGROUND OF THE INVENTION

(a) Field of the Invention

The present disclosure relates to a method for diagnosing an abnormal cell and a battery system applying the same.

(b) Description of the Related Art

A diagnosis for determining whether a battery cell has a problem or not is based on a range of a cell voltage value. For example, when the cell voltage value is within a predetermined normal range, it may be diagnosed that the corresponding battery cell has no problem.

However, a battery cell with a defect may be operated with a cell voltage within a normal range. In this case, the battery cell with a defect may not be detected.

SUMMARY

The present invention has been made in an effort to provide a method for diagnosing an abnormal cell and a battery system applying the same.

An embodiment of the present invention provides a battery system including: a battery pack including a plurality of battery cells; and a battery management system configured to periodically measure respective cell voltages of the battery cells at a wake-up time and after the wake-up time; detect a maximum cell voltage and a minimum cell voltage among the respective cell voltages; compare the minimum cell voltage to a measured cell voltage of at least one first diagnosis target battery cell, compare the maximum cell voltage to a measured cell voltage of at least one second diagnosis target battery cell, and diagnose whether either or both of the first and second diagnosis target battery cells is abnormal according to results of the comparisons.

The plurality of battery cells may include n battery cells battery management system may be configured to assign numbers 1-n to the plurality of battery cells according to an order of the respective cell voltages from a highest cell voltage to a lowest cell voltage; set at least the battery cell having the highest cell voltage as the at least one first diagnosis target battery cell; and set at least the battery cell having the lowest cell voltage as the at least one second diagnosis target battery cell.

In response to n being an even number, the battery management system may be configured to set the first n/2 battery cells according to the order of the respective cell voltages as first diagnosis target battery cells, and set the last n/2 battery cells according to the order of the respective cell voltages as second diagnosis target battery cells.

In response to n being an odd number, the battery management system may be configured to set the first (n−1)/2 battery cells according to the order of the respective cell voltages as first diagnosis target battery cells, set the last (n−1)/2 battery cells according to the order of the respective cell voltages as second diagnosis target battery cells, and set the median battery cell according to the order of the respective cell voltages as either a first diagnosis battery cell or a second diagnosis battery cell.

The battery management system may include a sub-control circuit connected to the plurality of battery cells and configured to periodically measure the cell voltages of the respective battery cells from the wake-up time, and a main control circuit configured to diagnose that the at least one first diagnosis target battery cell is abnormal in response to the measured cell voltage of the at least one first diagnosis target battery cell being equal to or less than the minimum cell voltage for one or more cell voltage measuring periods and diagnose that the at least one second diagnosis target battery cell is abnormal in response to the measured cell voltage of the at least one second diagnosis target battery cell being equal to or greater than the maximum cell voltage for one or more cell voltage measuring periods.

The main control circuit may be configured to assign numbers 1-n to the plurality of battery cells according to an order of the respective cell voltages from a highest cell voltage to a lowest cell voltage, and set at least the battery cell having the highest cell voltage as the at least one first diagnosis target battery cell cell, and may set at least the battery cell having the lowest cell voltage to be the at least one second diagnosis target battery cell.

Another embodiment of the present invention provides a method for diagnosing an abnormal cell of a battery system including a plurality of battery cells, including: periodically measuring, by a battery management system, respective cell voltages of the battery cells at a wake-up time and after the wake-up time; assigning, by the battery management system, numbers 1-n to the plurality of battery cells according to an order of the respective cell voltages from a highest cell voltage to a lowest cell voltage; detecting a minimum cell voltage and a maximum cell voltage from among the respective voltages; determining, by the battery management system, whether the respective cell voltages of one or more first diagnosis target battery cells including at least the cell assigned number 1 are equal to or less than the minimum cell voltage; determining, by the battery management system, whether the respective cell voltages of one or more second diagnosis target battery cells including at least the cell assigned number n are equal to or greater than the maximum cell voltage; and diagnosing, by the battery management system, whether either or both of the one or more first diagnosis target battery cells and the one or more second diagnosis target battery cells are abnormal based on results of the determinations.

The diagnosing that at least one first diagnosis target battery cells is abnormal may be based on the at least one first diagnosis target battery cells having a cell voltage that is equal to or less than the minimum cell voltage.

The diagnosing that at least one second diagnosis target battery cells are abnormal may be based on the at least one second diagnosis target battery cell having a cell voltage that is equal to or greater than the maximum cell voltage.

Regarding the method for diagnosing an abnormal cell, in response to n being an even number, assigning numbers 1-n to the plurality of battery cells may comprise setting the first n/2 battery cells according to the order of the respective cell voltages as first diagnosis target battery cells, or in response to n being an odd number, assigning numbers 1-n to the plurality of battery cells may comprise setting the first (n−1)/2 battery cells according to the order of the respective cell voltages as first diagnosis target battery cells and setting the median battery cell according to the order of the respective cell voltages as either a first diagnosis battery cell or a second diagnosis battery cell.

Regarding the method for diagnosing an abnormal cell, in response to n being an even number, assigning numbers 1-n to the plurality of battery cells may comprise setting the n last n/2 battery cells according to the order of the respective cell voltages as second diagnosis target battery cells, or in response to n being an odd number, assigning numbers 1-n to the plurality of battery cells may comprise setting the last (n−1)/2 battery cells according to the order of the respective cell voltages as second diagnosis target battery cells and setting the median battery cell according to the order of the respective cell voltages as either a first diagnosis battery cell or a second diagnosis battery cell.

The method for diagnosing abnormal cells and the battery system applying the same are provided.

DETAILED DESCRIPTION

Figure 1:
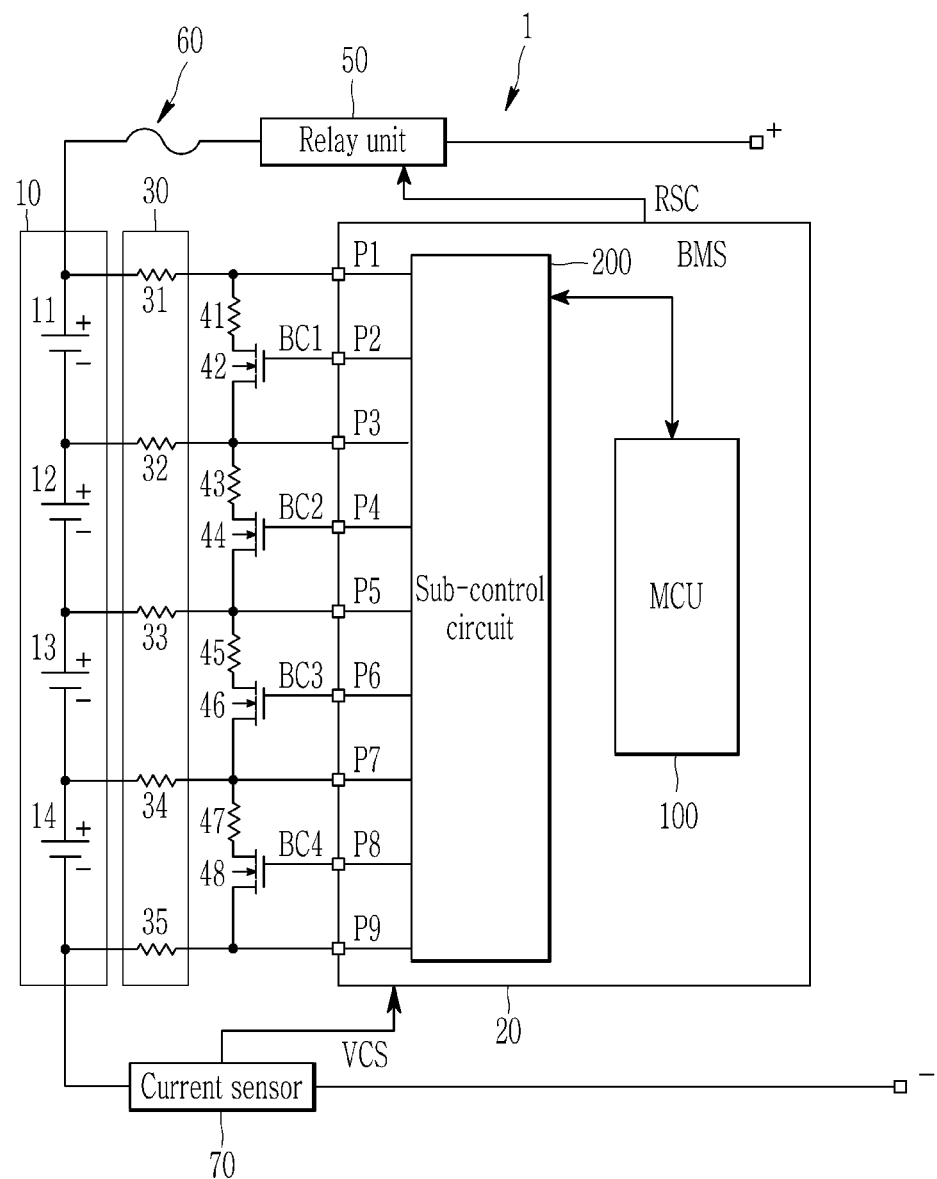
FIG. 1 shows a battery system according to an embodiment.

An embodiment of the present invention provides a battery system including: a battery pack including a plurality of battery cells; and a battery management system for setting numbers to the battery cells by measuring cell voltages of the respective battery cells at a wake-up time, detecting a maximum cell voltage and a minimum cell voltage by periodically measuring the cell voltage of the respective battery cells after the wake-up, comparing the minimum cell voltage and the cell voltage of at least one first diagnosis target battery cell, comparing the maximum cell voltage and the cell voltage of at least one second diagnosis target battery cell, and diagnosing whether the diagnosis target battery cell is abnormal according to results of the comparison.

The battery management system may set the battery cells to be a first cell to an n-th cell in order from a battery cell with a highest cell voltage to a battery cell with a lowest cell voltage from among the measured cell voltages, may set the first diagnosis target battery cells to include at least the first cell, and may set the second diagnosis target battery cells to include at least the n-th cell, and the n may be a natural number for indicating an entire number of the battery cells.

When the n is an even number, the first diagnosis target battery cells may include the first cell to an n/2-th cell, and the second diagnosis target battery cells may include the n/2-th cell to the n-th cell.

When the n is an odd number, the first diagnosis target battery cells may include the first cell to an (n−1)/2 or (n+1)/2-th cell, and the second diagnosis target battery cells may include the (n−1)/2 cell or (n+1)/2 cell to the n-th cell.

The battery management system may include a sub-control circuit connected to the battery cells and periodically measuring cell voltages of the respective battery cells from the wake-up time, and a main control circuit for diagnosing the battery cell with a cell voltage that is equal to or less than the minimum cell voltage to be abnormal from among the first diagnosis target battery cells and diagnosing the battery cell with a cell voltage that is equal to or greater than the maximum cell voltage to be abnormal from among the second diagnosis target battery cells for respective cell voltage measuring periods.

The main control circuit may set the battery cells to be a first cell to an n-th cell in order from the battery cell with the highest cell voltage to the battery cell with the lowest cell voltage from among the periodically measured cell voltages, may set at least the first cell to be the first diagnosis target battery cell, and may set at least the n-th cell to be the second diagnosis target battery cell.

Another embodiment of the present invention provides a method for diagnosing an abnormal cell in an abnormal cell diagnosing method by a battery system including a plurality of battery cells and a battery management system connected to the battery cells, including: measuring cell voltages of the respective battery cells at a wake-up time, and setting the battery cells to be a first cell to an n-th cell in order from the battery cell with the highest cell voltage to the battery cell with the lowest cell voltage (n is a number of the battery cells); periodically measuring cell voltages of the battery cells after the battery management system wakes up; detecting a minimum cell voltage and a maximum cell voltage from among voltages of the measured battery cells; determining whether the cell voltages of respective first diagnosis target battery cells including at least the first cell are equal to or less than the minimum cell voltage; determining whether the cell voltages of respective second diagnosis target battery cells including at least the n-th cell are equal to or greater than the maximum cell voltage; and diagnosing abnormal cells from among the battery cells based on results of the determination.

The diagnosing of an abnormal cell may include determining the battery cell with a cell voltage that is equal to or less than the minimum cell voltage to be abnormal from among the first diagnosis target battery cells.

The diagnosing of an abnormal cell may include determining the battery cell with a cell voltage that is equal to or greater than the maximum cell voltage to be abnormal from among the second diagnosis target battery cells.

Regarding the method for diagnosing an abnormal cell, when the n is an even number, the first cell to the n/2-th cell may be set to be the first diagnosis target battery cells, or when the n is an odd number, the first cell to the (n−1)/2 or (n+1)/2-th cell may be set to be the first diagnosis target battery cells.

Regarding the method for diagnosing an abnormal cell, when the n is an even number, the n/2-th cell to the n-th cell may be set to be the second diagnosis target battery cells, or when the n is an odd number, the (n−1)/2 or (n+1)/2-th cell to the n-th cell may be set to be the second diagnosis target battery cells Hereinafter, embodiments disclosed in the present specification will be described in detail with reference to the accompanying drawings. In the present specification, the same or similar components will be denoted by the same or similar reference numerals, and an overlapped description thereof will be omitted. The terms "module" and "unit" for components used in the following description are used only in order to make the specification easier. Therefore, these terms do not have meanings or roles that distinguish them from each other by themselves. In describing embodiments of the present specification, when it is determined that a detailed description of the well-known art associated with the present invention may obscure the gist of the present invention, it will be omitted. The accompanying drawings are provided only in order to allow embodiments disclosed in the present specification to be easily understood and are not to be interpreted as limiting the spirit disclosed in the present specification, and it is to be understood that the present invention includes all modifications, equivalents, and substitutions without departing from the scope and spirit of the present invention.

Terms including ordinal numbers such as first, second, and the like, will be used only to describe various components, and are not to be interpreted as limiting these components. The terms are only used to differentiate one component from others.

It is to be understood that when one component is referred to as being "connected" or "coupled" to another component, it may be connected or coupled directly to another component or be connected or coupled to another component with the other component intervening therebetween. On the other hand, it is to be understood that when one component is referred to as being "connected or coupled directly" to another component, it may be connected or coupled to another component without the other component intervening therebetween.

It will be further understood that terms "comprises" or "have" used in the present specification specify the presence of stated features, numerals, steps, operations, components, parts, or a combination thereof, but do not preclude the presence or addition of one or more other features, numerals, steps, operations, components, parts, or a combination thereof.

FIG. 1 shows a battery system according to an embodiment.

The battery system 1 shown in FIG. 1 may be installed in a vehicle, an electric field load such as a motor may be connected to an output end (+, −), and the battery system 1 may supply a power voltage to the electric field load. The output end (+, −) of the battery system 1 may be connected to a charger (not shown) and may receive the power voltage from the charger and may be charged. The battery system 1 may be operable by a discharging mode for supplying the power voltage to the electric field load and a charging mode for receiving the power voltage from the charger.

The battery system 1 includes a battery 10, a battery management system (BMS) 20, a cell voltage measuring circuit 30, a cell balancing circuit 40, a relay unit 50, a fuse 60, and a current sensor 70.

As shown in FIG. 1, the battery 10 includes a plurality of battery cells 11 to 15 connected in series. FIG. 1 shows that the battery 10 includes four battery cells 11 to 14, which is however an example and the present embodiment is not limited thereto.

The fuse 60 may be connected between a positive electrode of the battery 10 and an output terminal (+), and may be disconnected when a temperature thereof reaches a threshold value because of an overcurrent.

The relay unit 50 controls a current path when the battery 10 is charged and discharged. It is controlled to close and open the relay unit 50 by a relay control signal (RSC) supplied from the BMS 20.

The current sensor 70 senses a direction of a current (a battery current hereinafter) flowing to the battery 10 and a size of the current, and may transmit a signal (VCS) for indicating the size of the sensed current and the direction thereof to the BMS 20.

The BMS 20 controls a charging and discharging current of the battery 10 based on information such as cell voltages of the battery cells 11 to 14 and a battery current, and controls the cell balancing circuit 40 on the battery cells 11 to 14 to perform a cell balancing operation. The BMS 20 may be respectively connected to the battery cells 11 to 14 through the cell voltage measuring unit 30 and may measure cell voltages.

To operate the battery system 1, the BMS 20 may first be woken up. At the wake-up time, the BMS 20 may measure the cell voltages of the respective battery cells 11 to 14, and may arrange the measured cell voltages to respectively set numbers to the battery cells 11 to 14, and after the wake-up time, the BMS 20 may periodically measure the cell voltages of the respective battery cells 11 to 14, may compare a maximum cell voltage and a minimum cell voltage with the cell voltage of at least one diagnosis target battery cell, and may diagnose whether the diagnosis target battery cell is abnormal according to a result of comparison.

A number of the diagnosis target battery cells may be set to not be the number (n) of the entire battery cells but the number (n/2) that corresponds to half the number of the entire battery cells. The first cell to the (n/2)-th cell excluding the (n/2)−1 low cells that may have a similar voltage to the n-th cell having the lowest cell voltage at the wake-up time may be set to be the diagnosis target battery cells to be compared to the minimum cell voltage. The number of the diagnosis target battery cells to be compared with the maximum cell voltage may be set with the number that corresponds to half of the entire battery cells. In the case of a charging, the (n/2)+1-th cell to the n-th cell excluding top n/2 cells that may have a similar voltage to the first cell with the highest cell voltage at the wake-up time may be set to be diagnosis target battery cells to be compared to the maximum cell voltage.

When this is applied to the battery system shown in FIG. 1, in the case of discharging, the third cell that may have a similar voltage to the fourth cell having the lowest cell voltage may have a cell voltage that is lower than that of the fourth cell because of a discharge, so it is not the diagnosis target battery cell, and the first cell and the second cell may be set to be the diagnosis target battery cells. In the case of charging, the second cell that may have a similar voltage to the first cell having the highest cell voltage may have a cell voltage that may be higher than that of the first cell, so it is not the diagnosis target battery cell, and the third cell and the fourth cell may be set to be the diagnosis target battery cells.

When the number of the battery cells is an odd number, half the number of the entire battery cells is not a natural number, so the number of the diagnosis target battery cells may be set to be a natural number that is close to the half the number of the entire battery cells. For example, when the number of the entire battery cells is n, the natural number that is close thereto may be (n−1)/2 or (n+1)/2.

The BMS 20 sets the battery cells 11 to 14 to be the first cell to the fourth cell in order of from the battery cell with the highest cell voltage to the battery cell with the lowest cell voltage. When it is detected by the BMS 20 that the cell voltages of the diagnosis target battery cells (the first cell and the second cell in an embodiment) are lower than a minimum cell voltage, the BMS 20 may diagnose that the battery cell with the cell voltage that is less than the minimum cell voltage has a defect. When it is detected by the BMS 20 that the cell voltages of the respective diagnosis target battery cells (the third cell and the fourth cell in an embodiment) become higher than the maximum cell voltage, the BMS 20 may diagnose that the battery cell with the cell voltage that is greater than the maximum cell voltage has a defect.

The cell voltage measuring circuit 30 includes a plurality of resistors 31 to 35. The resistor 31 is connected between a positive electrode of the battery cell 11 and an input end (P1), a first end of the resistor 32 is connected to a negative electrode of the battery cell 11 and a positive electrode of a battery cell 12, a second end of the resistor 32 is connected to an input end (P3), a first end of the resistor 33 is connected to a negative electrode of the battery cell 12 and a positive electrode of the battery cell 13, a second end of the resistor 33 is connected to an input end (P5), a first end of the resistor 34 is connected to a negative electrode of the battery cell 13 and a positive electrode of the battery cell 14, a second end of the resistor 34 is connected to an input end (P7), a first end of the resistor 35 is connected to a negative electrode of the battery cell 14 and a positive electrode of the battery cell 15, and a second end of the resistor 35 is connected to an input end (P9).

The cell balancing circuit 40 includes a plurality of resistors 41, 43, 45, and 47 and a plurality of battery cell balancing switches 42, 44, 46, and 48.

The resistor 41 and the cell balancing switch 42 are coupled in series between the input end (P1) and the input end (P3), a gate of the cell balancing switch 42 is connected to the output end (P2), and the cell balancing switch 42 is switched according to monitoring of the cell voltages and a cell balancing control signal (BC1) generated by the cell balancing sub-control circuit 200.

The resistor 43 and the cell balancing switch 44 are coupled in series between the input end (P3) and the input end (P5), a gate of the cell balancing switch 44 is connected to the output end (P4), and the cell balancing switch 44 is switched according to a cell balancing control signal (BC2) generated by the sub-control circuit 200.

The resistor 45 and the cell balancing switch 46 are coupled in series between the input end (P5) and the input end (P7), a gate of the cell balancing switch 46 is connected to the output end (P6), and the cell balancing switch 46 is switched according to a cell balancing control signal (BC3) generated by the sub-control circuit 200.

The resistor 47 and the cell balancing switch 48 are coupled in series between the input end (P7) and the input end (P9), a gate of the cell balancing switch 48 is connected to the output end (P8), and the cell balancing switch 48 is switched according to a cell balancing control signal (BC4) generated by the sub-control circuit 200.

The BMS 20 may include a main control circuit 100 and a sub-control circuit 200. The main control circuit 100 controls the operation of the BMS 20, and in detail, it controls the operation of the BMS 20 based on information on the cell voltage, the battery current, and the cell temperature received by the BMS 20.

The sub-control circuit 200 measures the cell voltages of the battery cells 11 to 14 according to control by the main control circuit 100. The sub-control circuit 200 measures the voltage of the battery cell 11 based on a voltage difference between the input end (P1) and the input end (P3), measures the voltage of the battery cell 12 based on a voltage difference between the input end (P3) and the input end (P5), measures the voltage of the battery cell 13 based on a voltage difference between the input end (P5) and the input end (P7), and measures the voltage of the battery cell 14 based on a voltage difference between the input end (P8) and the input end (P9). The battery cell voltages measured by the sub-control circuit 200 may be transmitted to the main control circuit 100.

The sub-control circuit 200 controls the cell balancing based on a plurality of battery cell voltages. For example, the sub-control circuit 200 may compare the respective battery cell voltages and a predetermined threshold value, may detect the battery cell with the cell voltage that is greater than a predetermined threshold value from among the battery cell voltages, and may generate a cell balancing control signal for discharging the detected battery cell. In another way, the sub-control circuit 200 may calculate deviation among the battery cell voltages, may detect the battery cell of which the calculated deviation is greater than a predetermined threshold value, and may generate a cell balancing control signal for discharging the detected battery cell.

The main control circuit 100 may arrange the cell voltages of the battery cells 11 to 14 measured at the wake-up time of the BMS 20 in order of high voltages to set numbers to the battery cells 11 to 14, may periodically measure the cell voltages of the battery cells 11 to 14 after the wake-up, may compare the maximum cell voltage and the minimum cell voltage and the cell voltages of the diagnosis target battery cells corresponding to the half the battery cells, and may diagnose whether the diagnosis target battery cells are abnormal according to a result of comparison.

A method for diagnosing an abnormal cell according to an embodiment will now be described with reference to FIG. 2.

Figure 2:
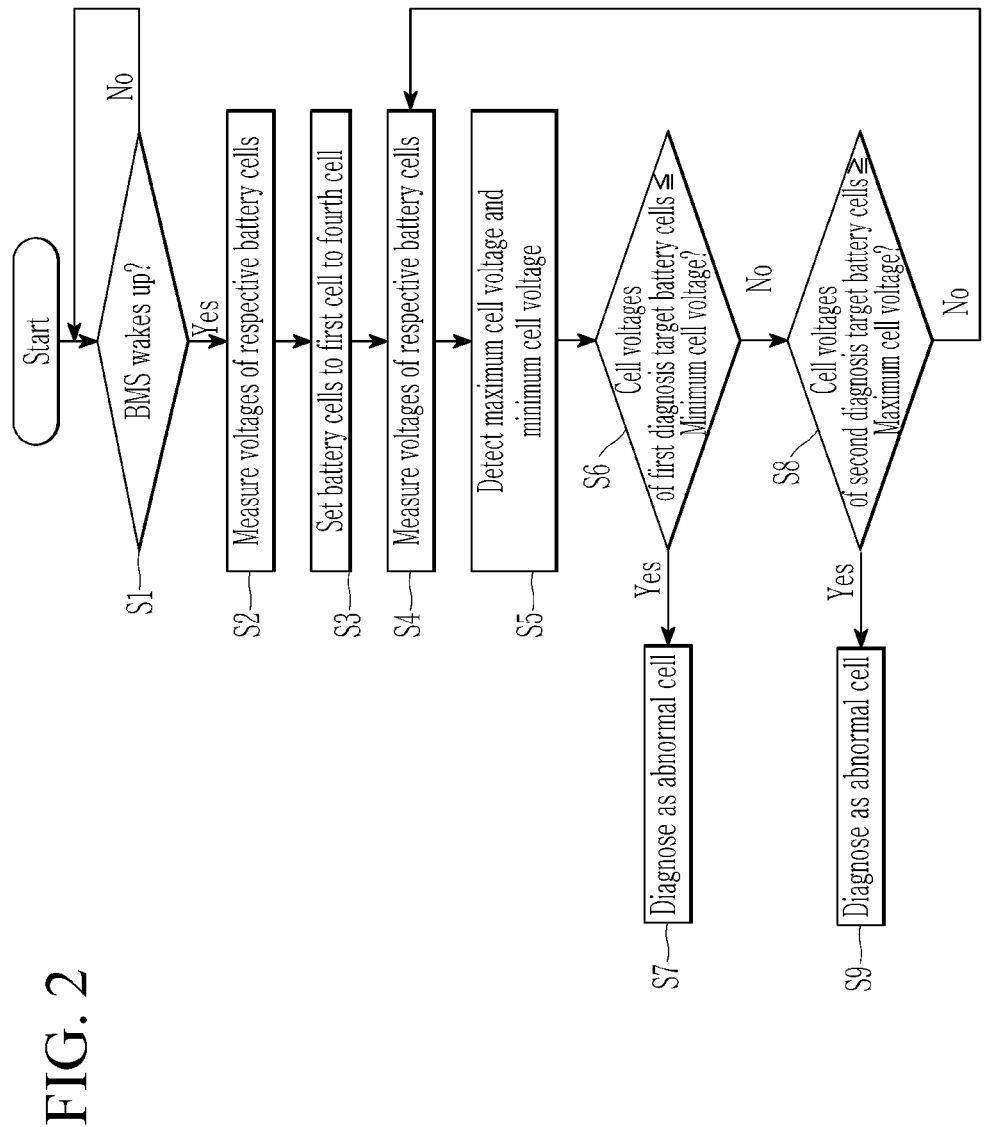
FIG. 2 shows a flowchart of a method for diagnosing abnormal cells according to an embodiment.

FIG. 2 shows a flowchart of a method for diagnosing abnormal cells according to an embodiment.

It is determined whether the BMS 20 woke up (S1). The BMS 20 may wake up in synchronization with a time when a power voltage is supplied to the BMS 20. The power voltage of the BMS 20 may be from the battery pack 10, or may be from an external power source that is different from the battery pack 10. The external power source may be installed in the battery system 1 or may be installed outside the battery system 1.

When the BMS 20 woke up according to a result of determination of S1, the main control circuit 100 controls the sub-control circuit 200 to measure the cell voltages of the respective battery cells. The cell voltages of the respective battery cells measured by the sub-control circuit 200 are transmitted to the main control circuit 100 (S2). When the BMS 20 did not wake up according to the result of determination of S1, the stage of S1 is repeated.

Regarding the received battery cell voltages, the main control circuit 100 sets the battery cells 11 to 14 to be the first cell to the fourth cell in order from the battery cell with the highest cell voltage to the battery cell with the lowest cell voltage (S3).

The main control circuit 100 controls the sub-control circuit 200 after the wake-up to periodically measure the cell voltages of the battery cells 11 to 14. The sub-control circuit 200 measures the cell voltages of the respective battery cells 11 to 14 (S4).

The main control circuit 100 detects the minimum cell voltage and the maximum cell voltage from among the battery cell voltages measured in S4 (S5).

The main control circuit 100 determines whether the cell voltages of the respective first diagnosis target battery cells (the first cell and the second cell) are less than the minimum cell voltage (S6). For example, the main control circuit 100 may calculate a first cell voltage deviation value that is generated by subtracting the minimum cell voltage from the cell voltages of the respective first diagnosis target battery cells, and may determine whether the first cell voltage deviation value is equal to or less than zero.

When at least one of the first diagnosis target battery cells is equal to or less than the minimum cell voltage according to the result of determination of S6, the main control circuit 100 may diagnose as that the corresponding battery cell is an abnormal cell (S7). For example, the main control circuit 100 may diagnose that the battery cell of which the first cell voltage deviation value is equal to or less than zero.

When the diagnosis target battery cells have cell voltages that are equal to or greater than that of the fourth cell according to the result of determination of S6, the next process is performed.

The main control circuit 100 determines whether the cell voltages of the respective second diagnosis target battery cells (the third cell and the fourth cell) are greater than the maximum cell voltage (S8). For example, the main control circuit 100 may calculate a second cell voltage deviation value that is the maximum cell voltage minus the cell voltages of the respective second diagnosis target battery cells, and may determine whether the second cell voltage deviation value is zero.

When at least one of the second diagnosis target battery cells is equal to or greater than the maximum cell voltage according to the result of determination of S8, the main control circuit 100 may diagnose that the corresponding battery cell is an abnormal cell (S7). For example, the main control circuit 100 may diagnose that the battery cell of which the second cell voltage deviation value is equal to or less than zero.

When the second diagnosis target battery cells have cell voltages that are equal to or less than the first cell according to the result of determination of S8, the main control circuit 100 repeats from S4.

When the abnormal cell is diagnosed to be found, the BMS 20 may stop the operation of the battery system 100.

Figure 3:
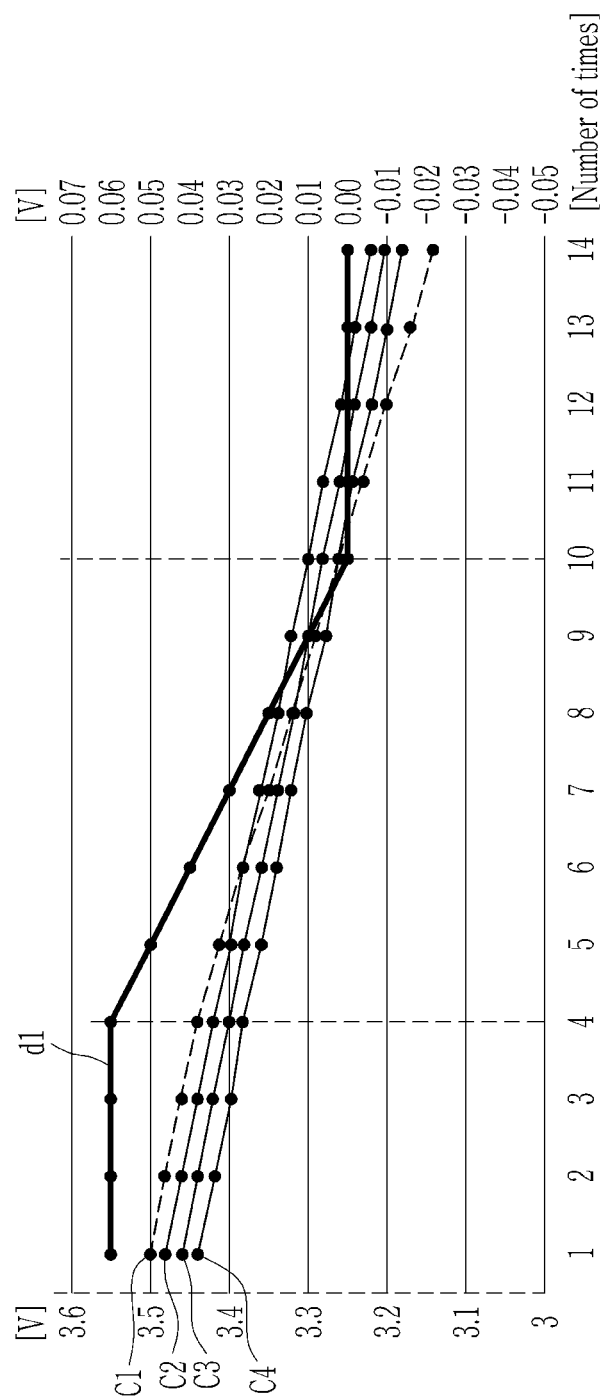
FIG. 3 shows a waveform diagram of voltages of battery cells in a discharging mode according to an embodiment.

FIG. 3 shows a waveform diagram of voltages of battery cells in a discharging mode according to an embodiment.

As shown in FIG. 3, the first cell (C1), the second cell (C2), the third cell (C3), and the fourth cell (C4) are set for the battery cells 11 to 14 based on the cell voltages of the battery cells 11 to 14 measured at the wake-up time (the cell voltage is measured once).

A left axis represents a unit axis for the cell voltages of the first cell to the fourth cell (C1 to C4), a right axis represents a unit axis for cell voltage deviation between a reference battery cell and the diagnosis target battery cell, and a horizontal axis represents a unit axis for a number of measuring the cell voltages for the battery cells 11 to 14. A unit of the left axis and the right axis is volts (V), and the unit of the horizontal axis is a number of times.

As shown in FIG. 3, a cell voltage reducing rate of the first cell (C1) is increased after four times, so the cell voltage of the first cell (C1) becomes the minimum cell voltage when the cell voltage is measured ten times, the cell voltage deviation (d1) becomes zero, and the minimum cell voltage is the cell voltage of the first cell (C1), so the cell voltage deviation (d1) is maintained at 0. The main control circuit 100 may diagnose the battery cell corresponding to the first cell (C1) from among the battery cells 11 to 14 to be an abnormal cell.

Figure 4:
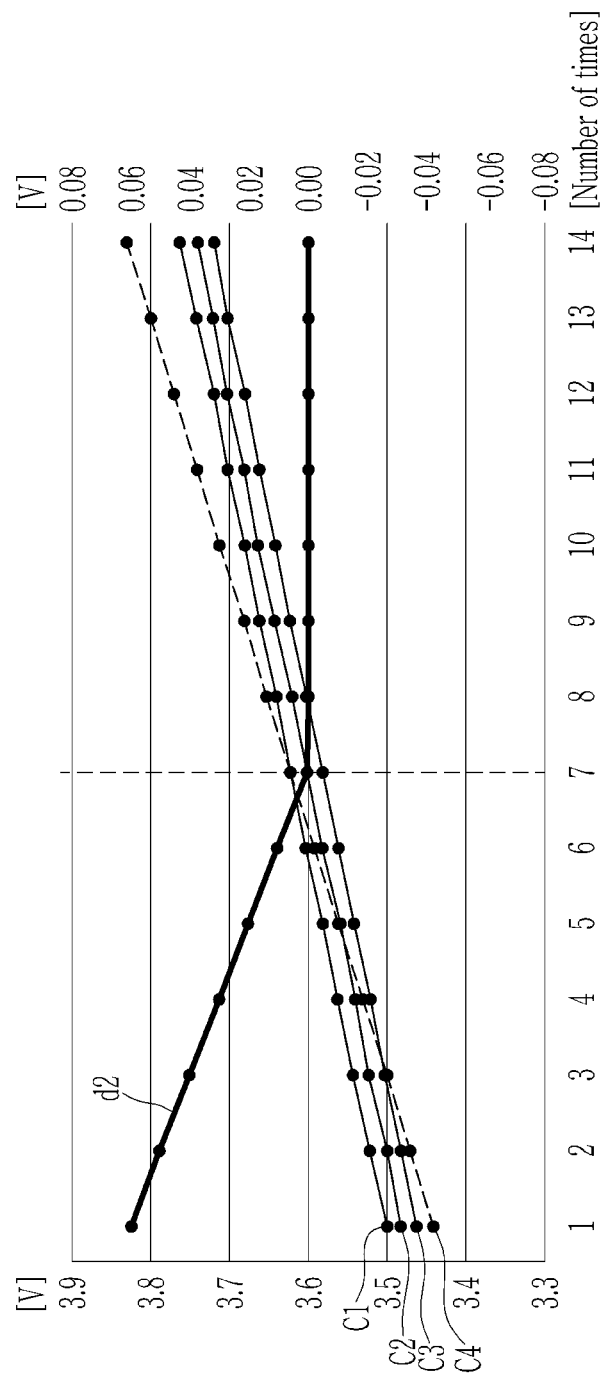
FIG. 4 shows a waveform diagram of voltages of battery cells in a charging mode according to an embodiment.

FIG. 4 shows a waveform diagram of voltages of battery cells in a charging mode according to an embodiment.

As shown in FIG. 4, the first cell (C1), the second cell (C2), the third cell (C3), and the fourth cell (C4) are set for the battery cells 11 to 14 based on the cell voltages of the battery cells 11 to 14 measured at the wake-up time (the cell voltage is measured once).

The left axis represents a unit axis for the cell voltages of the first cell to the fourth cell (C1 to C4), the right axis represents a unit axis for cell voltage deviation between a reference battery cell and the diagnosis target battery cell, and the horizontal axis represents a unit axis for a number of measuring the cell voltages for the battery cells 11 to 14. The unit of the left axis and the right axis is volts (V), and the unit of the horizontal axis is a number of times.

As shown in FIG. 4, a cell voltage increasing rate of the fourth cell (C4) is increased after the cell voltage is measured once, the cell voltage of the fourth cell (C4) becomes the maximum cell voltage when the cell voltage is measured seven times, the cell voltage deviation (d2) becomes zero, and as the maximum cell voltage is the cell voltage of the fourth cell (C4), the cell voltage deviation (d2) is maintained at 0. The main control circuit 100 may diagnose the battery cell corresponding to the fourth cell (C4) from among the battery cells 11 to 14 to be an abnormal cell.

As described above, the battery system according to an embodiment may detect the abnormal cell that is not detected in an overvoltage diagnosis and an under-voltage diagnosis. Referring to FIG. 3 and FIG. 4, a voltage range of the abnormal cells is within the normal voltage range that does not belong to the under-voltage and the overvoltage. Therefore, according to the conventional diagnosis method, the battery cell is not detected to be the abnormal cell.

According to prior art, the cell voltage deviation among the cell voltages of the battery cells at the wake-up time and the cell voltage deviation among the cell voltages of the battery cells measured while performing a discharge or charge are compared to each other, and when the cell voltage deviation increases according to the result of comparison, it is diagnosed as that there is an abnormal cell.

According to the conventional method, in an embodiment described with reference to FIG. 3, the cell voltage deviation in the wake-up case is about 0.06 V, and the cell voltage deviation when a defect is detected is about 0.05 V. That is, in the conventional art, the abnormality is diagnosed with reference to the highest value of the voltage deviations among the cell voltages, so the cell voltage deviation when the cell voltage is measured ten times shown in FIG. 3 is reduced further reduced compared to the cell voltage deviation at the wake-up time, and the conventional art fails to diagnose abnormal cells.

In a like manner, according to the conventional method, in an embodiment described with reference to FIG. 4, the cell voltage deviation in the wake-up case is about 0.06 V, and the cell voltage deviation when a defect is detected is about 0.05 V. Therefore, the cell voltage deviation when the cell voltage is measured seven times as shown in FIG. 4 is further reduced compared to the cell voltage deviation at the wake-up time, and the conventional art fails to diagnose abnormal cells.

According to prior art, when the abnormal state of the battery cell lasts for a long period of time, and the state such as the under-voltage, the overvoltage, or a very big cell voltage deviation is generated, the abnormal state of the battery cell is diagnosed.

Differing from this, the battery system and the abnormal cell detecting method according to an embodiment may add a new diagnosis logic without modifying the existing circuit, thereby diagnosing whether the cell is abnormal quicker than the prior art.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

What is claimed is:

1. A battery system comprising:

a battery pack including a plurality of battery cells; and
a battery management system configured to:
(i) at an initial time:
initially measure respective cell voltages of the battery cells;
classify two or more of the plurality of battery cells as at least one a first diagnosis target battery cell and at least one second diagnosis target battery cell, respectively, based on the initially measured respective cell voltages of the at least two battery cells, wherein the at least two battery cells are classified such that at the initial time each first diagnosis target battery cell has a higher voltage than each second diagnosis target battery cell;
(ii) after the initial time, periodically measure the respective cell voltages of the battery cells;
(iii) for a given time at which the respective cell voltages of the battery cells are measured:
detect a maximum cell voltage and a minimum cell voltage among the respective cell voltages measured at the given time;
compare the minimum cell voltage to a measured cell voltage of each one of the at least one first diagnosis target battery cells at the given time,
compare the maximum cell voltage to a measured cell voltage of each one of the at least one second diagnosis target battery cells at the given time,
diagnose whether either or both of the first and second diagnosis target battery cells is abnormal according to results of the comparisons, and
(iv) stop operation of the abnormal battery cells according to the diagnosis.

2. The battery system of claim 1, wherein the plurality of battery cells includes n battery cells, and wherein the battery management system is configured to, at the initial time:
assign numbers 1-n to the plurality of battery cells according to an order of the respective cell voltages from a highest cell voltage to a lowest cell voltage;
set at least the battery cell having the highest cell voltage as the at least one first diagnosis target battery cell; and
set at least the battery cell having the lowest cell voltage as the at least one second diagnosis target battery cell.

3. The battery system of claim 2, wherein, in response to n being an even number, the battery management system is configured to:
set the first n/2 battery cells according to the order of the respective cell voltages as first diagnosis target battery cells; and
set the last n/2 battery cells according to the order of the respective cell voltages as second diagnosis target battery cells.

4. The battery system of claim 2, wherein, in response to n being an odd number, the battery management system is configured to:
set the first (n−1)/2 battery cells according to the order of the respective cell voltages as first diagnosis target battery cells;
set the last (n−1)/2 battery cells according to the order of the respective cell voltages as second diagnosis target battery cells; and
set the median battery cell according to the order of the respective cell voltages as either a first diagnosis battery cell or a second diagnosis battery cell.

5. The battery system of claim 1, wherein the battery management system includes:
a sub-control circuit connected to the plurality of battery cells and configured to periodically measure the cell voltages of the respective battery cells from a wake-up time; and
a main control circuit configured to:
diagnose that the at least one first diagnosis target battery cell is abnormal in response to the measured cell voltage of the at least one first diagnosis target battery cell being equal to or less than the minimum cell voltage for one or more cell voltage measuring periods; and
diagnose that the at least one second diagnosis target battery cell is abnormal in response to the measured cell voltage of the at least one second diagnosis target battery cell being equal to or greater than the maximum cell voltage for one or more cell voltage measuring periods.

6. The battery system of claim 5, wherein
the main control circuit is configured to, at the initial time:
assign numbers 1-n to the plurality of battery cells according to an order of the respective cell voltages from a highest cell voltage to a lowest cell voltage; and
set at least the battery cell having the highest cell voltage as the at least one first diagnosis target battery cell.

7. The battery system of claim 5, wherein
the main control circuit is configured to, at the initial time:
assign numbers 1-n to the plurality of battery cells according to an order of the respective cell voltages from a highest cell voltage to a lowest cell voltage; and
set at least the battery cell having the lowest cell voltage to be the at least one second diagnosis target battery cell.

8. A method for diagnosing an abnormal cell of a battery system including a plurality of battery cells, the method comprising:
(i) at an initial time:
initially measuring, by the battery management system, respective cell voltages of the battery cells;
classifying, by the battery management system two or more of the plurality of battery cells as at least one first diagnosis target battery cell and at least one second diagnosis target battery cell, respectively, based on the initially measured respective cell voltages of the at least two battery cells, wherein the at least two battery cells are classified such that at the initial time each first diagnosis target battery cell has a higher voltage than each second diagnosis target battery cell;
(ii) after the initial time, periodically measuring, by the battery management system, respective cell voltages of the battery cells;
(iii) for a given time at which the respective cell voltages of the battery cells are measured:
detecting a minimum cell voltage and a maximum cell voltage from among the respective voltages measured at the given time;
determining, by the battery management system, whether the respective cell voltages of the one or more first diagnosis target battery cells are equal to or less than the minimum cell voltage at the given time;
determining, by the battery management system, whether the respective cell voltages of the one or more second diagnosis target battery cells are equal to or greater than the maximum cell voltage at the given time;

diagnosing, by the battery management system, whether either or both of the one or more first diagnosis target battery cells and the one or more second diagnosis target battery cells are abnormal based on results of the determinations; and (iv) stopping, by the battery management system, operation of the abnormal battery cells according to the diagnosis.

9. The method of claim 8, wherein diagnosing that at least one first diagnosis target battery cells is abnormal is based on the at least one first diagnosis target battery cells having a cell voltage that is equal to or less than the minimum cell voltage.

10. The method of claim 8, wherein diagnosing that at least one second diagnosis target battery cells are abnormal is based on the at least one second diagnosis target battery cell having a cell voltage that is equal to or greater than the maximum cell voltage.

11. The method of claim 8, wherein the battery system includes n battery cells, and the method includes one of:

in response to n being an even number, assigning numbers 1-n to the plurality of battery cells comprises setting the first n/2 battery cells according to the order of the respective cell voltages as first diagnosis target battery cells, or in response to n being an odd number, assigning numbers 1-n to the plurality of battery cells comprises setting the first (n−1)/2 battery cells according to the order of the respective cell voltages as first diagnosis target battery cells and setting the median battery cell according to the order of the respective cell voltages as either a first diagnosis battery cell or a second diagnosis battery cell.

12. The method of claim 8, wherein the battery system includes n battery cells, and the method includes one of:

in response to n being an even number, assigning numbers 1-n to the plurality of battery cells comprises setting the last n/2 battery cells according to the order of the respective cell voltages as second diagnosis target battery cells, or in response to n being an odd number, assigning numbers 1-n to the plurality of battery cells comprises setting the last (n−1)/2 battery cells according to the order of the respective cell voltages as second diagnosis target battery cells and setting the median battery cell according to the order of the respective cell voltages as either a first diagnosis battery cell or a second diagnosis battery cell.

* * * * *